United States Patent [19]

Ahrendt et al.

[11] Patent Number: 4,470,581
[45] Date of Patent: Sep. 11, 1984

[54] APPARATUS FOR SELECTIVE REDUCTION OF METALLIC OXIDES

[75] Inventors: William A. Ahrendt; David C. Meissner; Charles W. Sanzenbacher, all of Charlotte, N.C.; John C. Scarlett, Toledo, Ohio

[73] Assignee: Midrex Corporation, Charlotte, N.C.

[21] Appl. No.: 459,435

[22] Filed: Jan. 20, 1983

Related U.S. Application Data

[62] Division of Ser. No. 229,611, Jan. 29, 1981, Pat. No. 4,381,939.

[51] Int. Cl.$^3$ ............................................... F27B 1/22
[52] U.S. Cl. ..................................... 266/155; 266/156
[58] Field of Search ...................... 266/155, 156; 75/35

[56] References Cited

U.S. PATENT DOCUMENTS 2,931,720  4/1960  Vaney ........................................ 75/35
3,375,098  3/1968  Marshall ................................... 75/35
3,836,131  9/1974  Beggs ........................................ 75/35

Primary Examiner—M. J. Andrews
Attorney, Agent, or Firm—Ralph H. Dougherty

[57] ABSTRACT

Ores which include in combination iron oxide, cobalt oxide and nickel oxide are treated in a continuous shaft reduction furnace to selectively reduce nickel and cobalt to metallized form while leaving the iron oxide in the oxide form. Reacted top gas is recycled and mixed with partially combusted gasified fossil fuel in a combustion chamber to achieve the required concentration of reductants in the reducing gas. The cooling zone operates with a similar concentration of reductants in the cooling gas. Apparatus is also disclosed for carrying out the process.

2 Claims, 3 Drawing Figures

APPARATUS FOR SELECTIVE REDUCTION OF METALLIC OXIDES

This is a division of application Ser. No. 229,611, filed Jan. 29, 1981 now U.S. Pat. No. 4,381,939.

BACKGROUND OF THE INVENTION

In certain areas of the world, nickel-bearing ores such as nickel laterite ore contain the oxides of nickel, cobalt and iron, among other constituents. Nickel and cobalt are valuable metals when separated from the ore and reduced to metallic form. It is known in the metallurgical art that it is possible to separate metallics from oxides of these metals by a leaching process. Heretofore, metal oxides were reduced to metallic form in highly inefficient multiple hearth furnaces prior to leaching.

We have invented an efficient method and apparatus for the selective reduction of metallic oxides in a continuous shaft furnace process whereby nickel oxide may be reduced to metallic nickel while cobalt and iron remain in the oxide form, or nickel and cobalt may be reduced to metallic form while iron remains in the oxide form. Separation of the metallics from the oxides and other gangue is then carried out by the Sherritt-Gordon leaching process which removes the metallics and leaves the oxides and other gangue materials untouched.

SUMMARY OF THE INVENTION

A continuous shaft furnace for the direct reduction or ore is fueled by a mixture of partially-combusted gasified fossil fuel and recycled reacted top gas which are mixed in a combustion chamber to obtain the proper reducing gas composition. The shaft furnace contains a lower cooling zone through which cooling gas is passed, the cooling gas being augmented by gasified fossil fuel and recycled reacted top gas whereby the cooling gas contains a concentration of reductants similar to that of the reducing gas.

OBJECTS OF THE INVENTION

It is the principal object of this invention to provide a method for heat treating ores containing cobalt, nickel and iron oxides to selectively reduce only the nickel or nickel and cobalt to metallized form while leaving the remaining metallic oxides in the oxide form.

It is also an object of this invention to provide apparatus for the selective reduction of nickel oxide, cobalt oxide and iron oxide.

DETAILED DESCRIPTION

Figure 1:
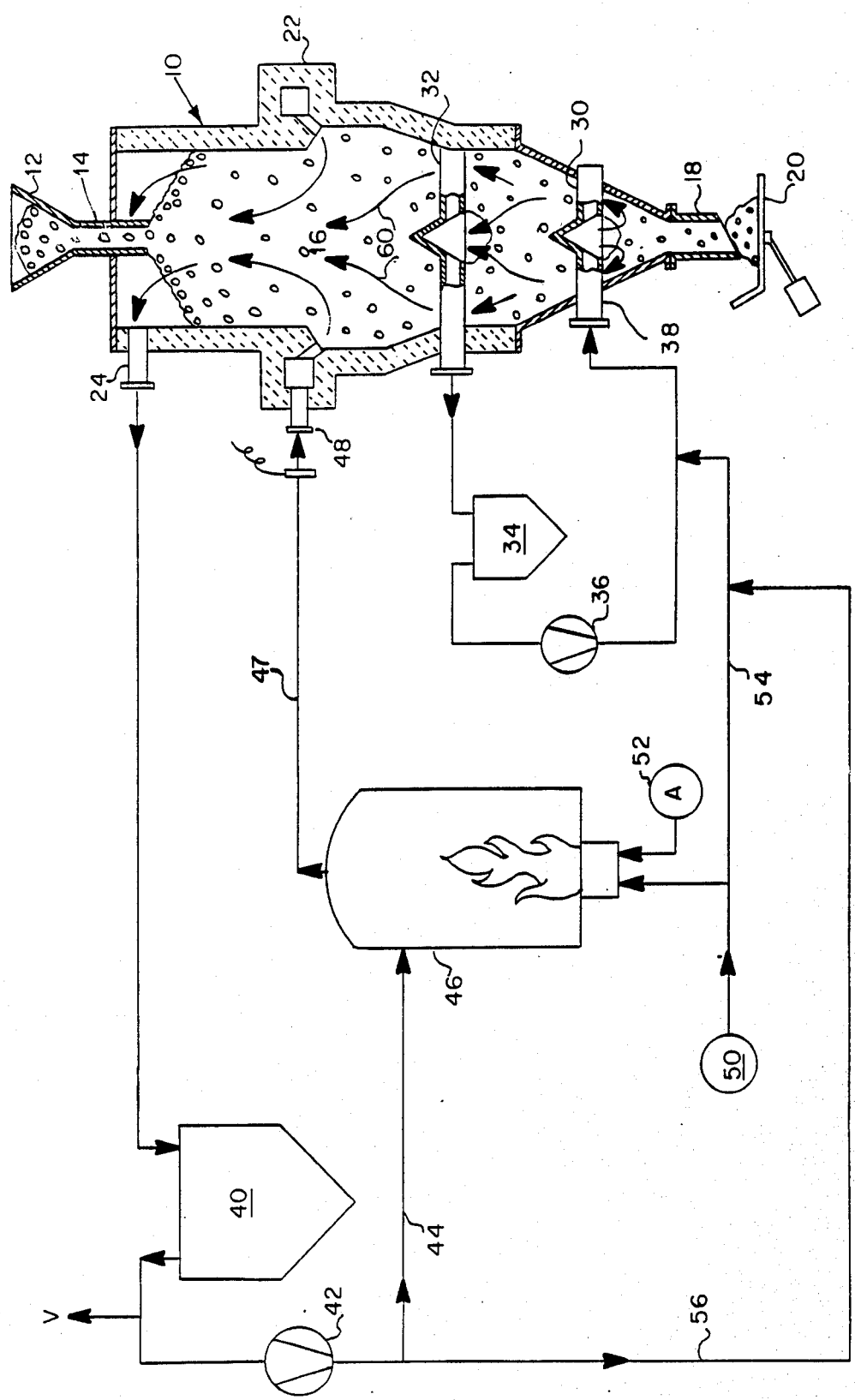
FIG. 1 is a diagrammatic flow sheet showing the invented process and apparatus suitable for its operation.

Referring now to FIG. 1, a shaft furnace 10 has a feed hopper 12 and a feed pipe 14 which extends into the furnace 10 beneath the top of the furnace to feed a packed-bed burden 16 into the furnace. The treated burden is removed from the bottom of the furnace through a product discharge pipe 18. Flow of the burden through the furnace is controlled by a discharge control device 20. Intermediate the ends of the furnace is a bustle and tuyere system 22 by which reducing gas is injected into the burden 16 within the furnace. A reacted gas offtake 24 is provided near the top of the furnace.

A cooling zone is located in the bottom portion of the furnace between cooling gas distributor 30 and cooling gas collector 32. The collector 32 is connected to a cooling gas recycle system including a cooler scrubber 34, compressor 36 and cooling gas inlet 38. The reacted top gas offtake 24 is connected to a reacted top gas cooler scrubber 40 and compressor 42. Pipe 44 connects compressor 42 with a combustion chamber 46 in which recycle gas is mixed with combustion products. Pipe 47 delivers the reducing gas mixture to reducing gas intake 48. The combustion chamber 46 is an atmosphere generator which is fueled by coal gas from a gasifier 50 mixed with combustion air 52. A portion of the gas from gasifier 50 is injected into the cooling gas circuit through pipe 54. Pipe 56 connects compressor 42 with gasifier gas pipe 54 to inject recycle gas into the cooling zone.

Figure 3:
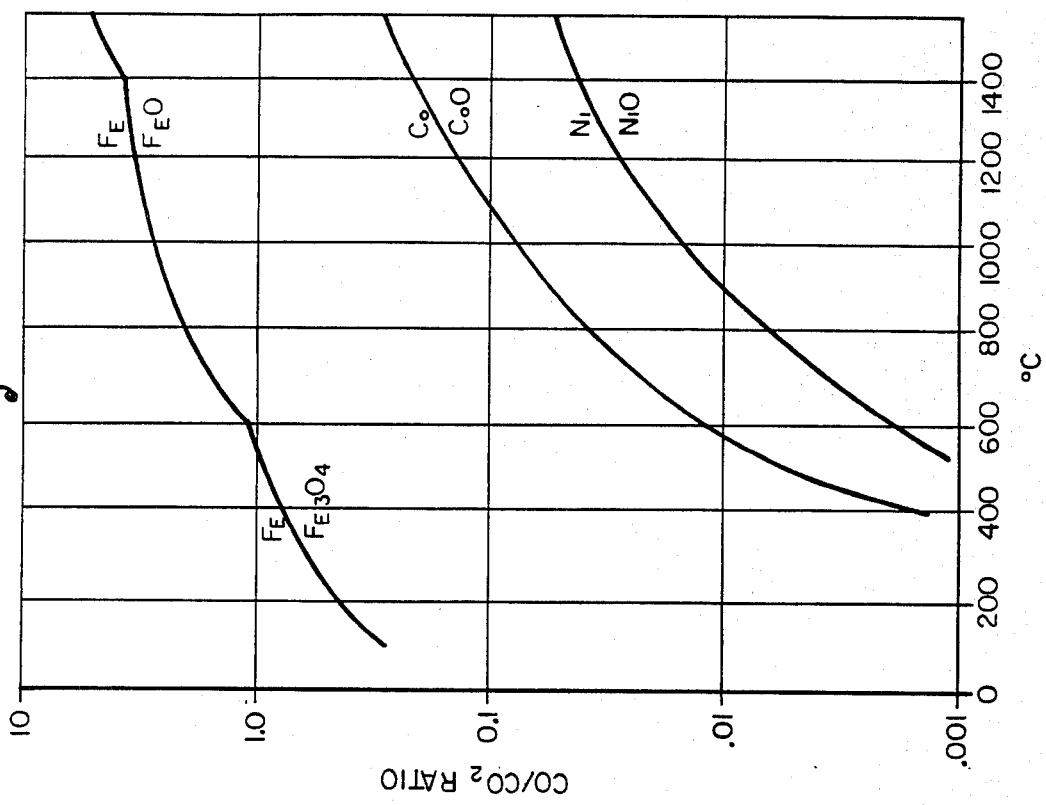
FIG. 3 is an equilibrium diagram showing the reduction reaction curves for nickel oxide, cobalt oxide and iron oxide at various $CO$ to $CO_2$ gas ratios.
Figure 2:
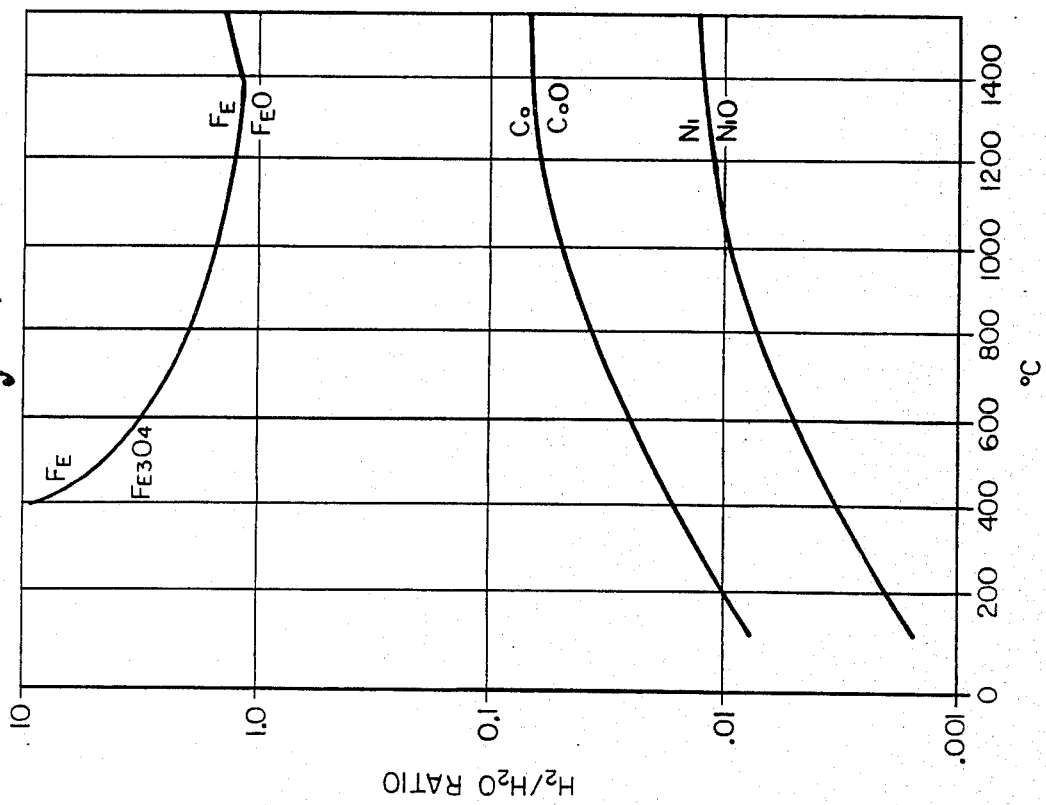
FIG. 2 is an equilibrium diagram showing the reduction reactive curve for nickel oxide, cobalt oxide and iron oxide at various $H_2$ to $H_2O$ gas ratios.

In operation, agglomerates or natural lumps of a nickel laterite ore containing the oxides of nickel, cobalt and iron are introduced to the top of shaft furnace 10 through charge hopper 12 and seal leg 14. The nickel and cobalt are selectively reduced to their metallic states while the iron is reduced to a lower oxide form ($Fe_3O_4$). This selective reduction takes place in the reduction zone of the shaft furnace through which the agglomerates descend by gravity and are contacted by the countercurrent flow of a hot reducing gas which contains sufficient reductants ($CO+H_2$) to reduce the nickel or nickel and cobalt oxides to the metallic state but not enough to reduce the iron oxide to the metallic state. FIGS. 2 and 3 show the ranges or reductant to oxidant ratios or concentrations to reduce nickel alone, or both nickel and cobalt over a range of furnace temperatures.

The reduced agglomerates leave the reduction zone, which is defined as the zone above the hot reducing gas inlets, and enter a short transition zone which extends from the hot gas inlets down to the cooling zone gas offtakes 32. The agglomerates enter the cooling zone where they are cooled to approximately 50° C. by direct contact with a cold recirculated gas that contains a concentration of reductants similar to the bustle gas. The cold reduced agglomerates are discharged from the furnace through pipe 18 and are then ready for the subsequent downstream processing to recover the nickel or nickel and cobalt.

Cold coal gas from source 50 that has been desulfurized is sent to a combustion chamber 46 wherein the coal gas is combusted with a stoichiometric deficiency of air to produce a flue gas that contains between 5 and 10% $CO+H_2$. Cooled and scrubbed top gas is added to the combustion chamber through line 44 to produce a reducing gas with the proper composition and proper temperature to selectively reduce the nickel and cobalt oxides. The reducing gas is introduced into the shaft furnace at a temperature of from about 800° C. to about 1000° C. via bustle and tuyere system 22 around the periphery of the furnace. The hot reducing gas which flows countercurrent to the descending burden heats the agglomerates and reduces the nickel and cobalt oxides to their metallic state and reduces the hematite present to magnetite. The reacted top gas leaving the furnace through outlet 24 contains a lower amount of $CO+H_2$ and more $H_2O+CO_2$ from the reduction, drying, and calcining reactions. The temperature of the top gas has been reduced substantially but is higher than the dew point of the gas to prevent condensation before entering the scrubber. In the scrubber 40 the gas is cleaned of dust and cooled. A portion of the cleaned top gas is vented from the system through vent V to control nitrogen buildup. The balance of the top gas is compressed and split into two streams. One stream is fed into the combustion chamber 46 wherein it is mixed with hot flue gas to produce the desired reduction gas. The other stream is fed to the cooling zone gas recirculating loop. A small flow of cold coal gas is also fed to the cooling zone gas recirculating loop. The flows of top gas and coal gas are adjusted and controlled to produce a gas composition very similar to the reducing gas entering the reduction zone. The cooling gas, which assumes the analysis of the mixture of top gas and coal gas, enters the furnace through a cooling gas distributor 30. The cold gas flows through the descending burden where the gas is heated to approximately 370° C. before most of the gas is collected in the cooling gas offtakes 32. This major stream is cooled, scrubbed, and compressed before additional top gas and coal gas are added prior to re-entering the cooling zone. A minor portion of the warmed cooling gas flows upward through the transition zone and into the center of the reduction zone as indicated by arrows 60. It is in the transition zone that the warmed gas is heated to reduction temperature by the descending hot burden. Thus a significant amount of hot reducing gas (with proper temperature and composition) is obtained by this heat exchange and without the burning of additional coal gas. This in-situ heating of the cooling zone gas results in one of the most efficient processes ever invented for selective reduction of metallic oxides with an external source of reductant.

What is claimed is:

1. Apparatus for selective reduction of metallic oxides, comprising:
   (a) a substantially vertical shaft furnace having means for feeding a packed-bed burden to the interior thereof and means for withdrawing treated particulate burden material from the bottom thereof to establish a gravitational flow of material therethrough;
   (b) a reducing gas inlet intermediate the ends of the furnace for introducing reducing gas to the interior of said furnace;
   (c) reacted top gas withdrawal means at the top of said furnace for withdrawing reacted top gas therefrom;
   (d) a cooling gas inlet for introducing cooling gas into the lower portion of said furnace;
   (e) means above said cooling gas introduction means for collecting and withdrawing a substantial portion of said cooling gas from said cooling zone;
   (f) means communicating with said cooling gas withdrawal means for cleaning and cooling said withdrawn cooling gas, and said cleaning and cooling means communicating with said cooling gas inlet;
   (g) means for cooling and scrubbing reacted top gas communicating with said reacted top gas removal means;
   (h) means for dividing the cleaned and cooled reacted top gas into two streams, the first stream communicating with a combustion chamber, the second stream communicating with a cooling gas recirculating system;
   (i) an atmosphere generator comprising a combustion chamber supplied by gaseous fossil fuel and combustion air as required, wherein said fossil fuel is burned and burnt fuel gases and said first stream of reacted top gas are mixed to form the reducing gas;
   (j) means for conducting said reducing gas from said combustion chamber to the inlet of said shaft furnace;
   (k) means for conducting a first stream of gaseous fossil fuel to said combustion chamber as fuel; and
   (l) means for conducting a second stream of gaseous fossil fuel to said recirculating cooling gas circuit.

2. Apparatus according to claim 1 further comprising reacted gas top gas vent means in the conduit between said reacted gas cooling and cleaning means and said reacted gas dividing means.

* * * * *